(12) United States Patent
Fogg

(10) Patent No.: US 7,843,346 B2
(45) Date of Patent: Nov. 30, 2010

(54) METAL CLOSURE WITH RFID DEVICE

(75) Inventor: Martin Fogg, Bicester (GB)

(73) Assignee: Obrist Closures Switzerland GmbH, Reinach (CH)

( * ) Notice: Subject to any disclaimer, the term of this patent is extended or adjusted under 35 U.S.C. 154(b) by 560 days.

(21) Appl. No.: 11/913,595

(22) PCT Filed: Apr. 28, 2006

(86) PCT No.: PCT/GB2006/001568

§ 371 (c)(1),
(2), (4) Date: Nov. 5, 2007

(87) PCT Pub. No.: WO2006/120379

PCT Pub. Date: Nov. 16, 2006

(65) Prior Publication Data

US 2008/0198020 A1    Aug. 21, 2008

(30) Foreign Application Priority Data

May 6, 2005    (EP) .................................. 05103792

(51) Int. Cl.
    *G08B 13/14* (2006.01)
(52) U.S. Cl. .................. 340/572.7; 340/572.1
(58) Field of Classification Search .............. 340/572.1, 340/572.7
See application file for complete search history.

(56) References Cited

U.S. PATENT DOCUMENTS

| 4,750,312 | A  | * | 6/1988  | de Vaujany ................... 53/307 |
| 6,137,413 | A  | * | 10/2000 | Ryan, Jr. ................... 340/572.8 |
| 7,126,479 | B2 | * | 10/2006 | Claessens et al. ........ 340/572.1 |
| 2004/0052202 | A1 | * | 3/2004 | Brollier ...................... 369/273 |
| 2006/0077062 | A1 |   | 4/2006 | Andrechak et al. |

FOREIGN PATENT DOCUMENTS

| EP | 19940420109 A1 | 10/1994 |
| WO | PCT/US99/24104 A1 | 10/1999 |
| WO | PCT/GB2004/003821 A2 | 3/2005 |

\* cited by examiner

*Primary Examiner*—Daniel Wu
*Assistant Examiner*—Ryan W Sherwin
(74) *Attorney, Agent, or Firm*—Bradley Arant Boult Cummings, LLP

(57) ABSTRACT

A closure (10) and RFID device (15) in combination, wherein the closure comprises a metal shell and the RFID device comprises a tag (40) and antenna means (80), wherein the tag (40) comprises an RFID chip (60) and an electrical circuit (50), and wherein the antenna means (80) is adapted to be one side of a dipole, and the RFID device is entirely located within the metal closure with the electrical circuit (50) electrically connected (70) to the metal closure (10) so that the closure becomes the other side of the dipole antenna.

12 Claims, 8 Drawing Sheets

METAL CLOSURE WITH RFID DEVICE

The present invention concerns an identification device and metallic closure in combination for use with containers such as bottles of spirits or wines.

Identification systems, such as "EAS"—Electronic Article Surveillance systems, are known in which a tag is detected by appropriate means. However, these operate at a relatively low frequency (below 100 MHz) and typically only allow the detecting device to detect their presence or absence thereof.

Consequently, more advanced devices which can provide more information have been produced. These devices are known as radio frequency identification tags, also known as "RFID" tags. These devices have recently become widespread in the packaging industry.

The chip within the RFID tag can contain a relatively large amount of information which may be read, and/or in some cases written to, remotely by a reading device. The tag can be active in that it is powered by an incorporated battery to actively transmit a signal or, as is more typical, can be passive in that it is activated when an appropriate external radio signal is transmitted by a reading device and received by the RFID tag.

The information is typically concerned with the product to which the tag is attached. For instance the information can be the date the product was made, the source of the product, its weight, size, intended destination, stock number etc. US patent application published as US2004143505 discusses the use of RFID tags for inventory control.

This information is broadcast by the RFID tag using radio frequency radiation which can lie anywhere in the radio frequency range. However, ultra high frequency (UHF is typically defined as 300 to 3000 MHz) is preferred over low frequency for various reasons including that of increased range and use of smaller antenna requirements due to use of smaller wavelengths.

Although most RFID tags are readable when they are attached to the external surface of objects there are exclusions to this. For instance, if an RFID tag is placed on the surface of an object which is even slightly electrically conductive, for example metal or glass, the signal strength produced by the tag is greatly reduced. This is exacerbated by the presence of liquid inside the object. One way to overcome this is to place an insulating layer between the tag and the surface of the object. However, this layer has to be relatively thick, a feature which can detract from the aesthetics of the packaging. Further, surface mounted tags can be easily tampered with, or become accidentally damaged.

One way to overcome this problem is to place the tags inside the packaging. However, this can cause other problems in that the walls of the object can interfere with the radio signals and can even block them completely. This is especially the case when the walls are made of metal. In the packaging industry there is a desire to fit RFID tags to bottles. However, as discussed above, there are inherent problems with this. It has, however, been found that the closure can be used to hold the tag.

European patent EP 0619243 A describes a closure with an electromagnetically detectable device located therein. However, the device is located against the inside flat surface of the top plate of the closure. This means that if the closure is made of metal, which is often the case for spirit bottles, the device will not be readable remotely since the metal layer will interfere with the radio frequency radiation.

International patent application WO 0026878 describes how this may be overcome by locating part of the device perpendicularly below the closure such that it is outside of the metal closure walls. However, the presence of a device hanging down inside a bottle neck which would be visible to the consumer is undesirable for aesthetic reasons. Further, such a system would make the fitting of the closures to the bottles difficult without causing damage to the device due to the nature of present day high-speed filling and closure-fitting lines.

It is desirable to be able to fit RFID devices fully inside metal closures but still be able to read them remotely.

More recently, it has been proposed in international patent application WO 2005/024745 to provide an RFID tag on a container having a metal closure where the system is mounted within or externally of the metal closure. There is, however, a limit to the range at which a transmitted signal can be detected with such an arrangement.

According to one aspect of the present invention there is provided an RFID device for a closure comprising an electrically conductive shell, the device comprising a tag and antenna means, the tag comprising an RFID chip and the antenna means comprising one side of a dipole, the device being, in use, entirely located within a metal closure and electrically coupled thereto so that the closure becomes the other side of the dipole.

According to a further aspect there is provided a closure and RFID device in combination, wherein the closure comprises an electrically-conductive shell and the RFID device comprises a tag and antenna means, the tag comprises an RFID chip, and the antenna means is one side of a dipole, the RFID device being entirely located within the closure and electrically coupled to the closure so that the closure becomes the other side of the dipole.

By electrically connecting the RFID tag to the closure, such that the closure becomes one side of a dipole antenna, it has been found that it is possible to remotely read the RFID tag. This reading may occur both at the sides and above the closed end of the closure.

The antenna may be of various shapes. Each different shape produces a differently shaped radiation pattern. It is considered to be useful to be able to influence the shape of the radiation pattern produced by the device for differing applications. An example of a suitable shape is a cone.

In one embodiment, a spacer is used to bring the device closer to the open end of the closure. This further enhances the strength of the signal measured remotely and therefore increases the distance over which the tag may be read.

In another embodiment of the invention, the device is positioned inside an insert to protect it.

In yet another embodiment the antenna can be made to contact a liquid contained in an associated container. This has the advantage of boosting the strength of the radio frequency field.

In another aspect, the invention provides a closure and RFID device in combination, wherein the closure comprises an electrically-conductive shell and the RFID device comprises an RFID chip and antenna means, and the antenna means is adapted to be one side of a dipole, and the RFID chip being electrically coupled to the electrically-conductive closure so that the closure becomes the other side of the dipole antenna, the closure and RFID device combination being associated with a body of liquid, and the antenna means being in contact with the body of liquid.

The shell is a closure such as a closure cap for a bottle which may be threaded for securing on a threaded neck of a bottle such as may contain wine, spirits or liqueurs. The shell may be formed of metal or may be of a metallised material such as a suitable plastics material coated with a functional and/or decorative metallic coating on its interior and/or exterior surfaces. It will also be appreciated from an understanding of the ensuing description that the invention is equally applicable to and useful for closures of the type which provide a push-fit in the neck of a bottle.

The present invention also provides, in another aspect, a closure and RFID device in combination, wherein the closure comprises a member which is arranged to provide a tight sealing fit within a neck of a container, the closure comprising electrically-conductive material and/or being coated with electrically-conductive material, and wherein the RFID device comprises an RFID chip and antenna means, and is accommodated within the member, and the antenna means is one side of a dipole, and the RFID device being entirely located within the closure and electrically coupled to the closure so that the closure becomes the other side of the dipole.

According to a further aspect there is provided a closure and RFID device in combination, wherein the closure comprises a metal shell and the RFID device comprises a tag and antenna means, wherein the tag comprises an RFID chip and an electrical circuit, and wherein the antenna means is adapted to be one side of a dipole, and the RFID device is entirely located within the metal closure with the electrical circuit electrically connected to the metal closure so that the closure becomes the other side of the dipole antenna.

The invention further provides, in another aspect, a closure and RFID device in combination, wherein the closure comprises a member which is arranged to provide a tight sealing fit within a neck of a container, the closure comprising electrically-conductive material and/or being coated with electrically-conductive material, and the RFID device comprising an RFID chip and antenna means, and the antenna means being adapted to be one side of a dipole, and the RFID chip being electrically coupled to the electrically-conductive closure so that the closure becomes the other side of the dipole antenna, the closure and RFID device combination being associated with a body of liquid, and the antenna means being in contact with the body of liquid.

Embodiments of the invention will now be described, by way of example, with reference to the following drawings in which.

Figure 1:
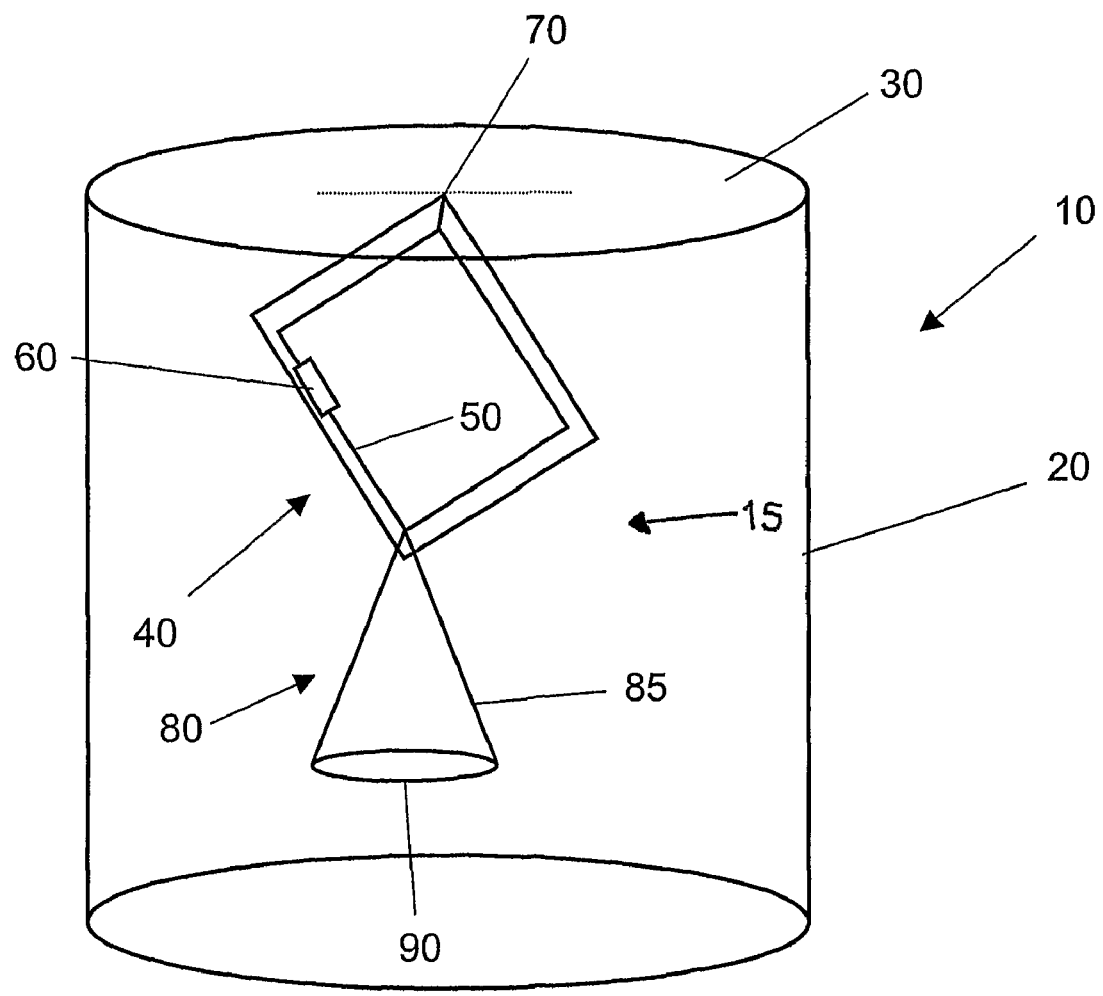
FIG. 1 shows diagrammatically a side view of a combination of a closure with an RFID tag and antenna according to one embodiment of the invention.

In FIG. 1, a closure is generally indicated 10. The closure 10 is formed from aluminium and has a crown 30 and a depending skirt 20. In use, the skirt 20 would sit around and outside a container neck (not shown) in a manner generally understood. Accordingly, the skirt 20 may have a screw thread or snap bead or other means formed therein for retaining the closure to the container neck. Further, the closure 10 may have a wad inside and adjacent the undersurface of the crown 30. This wad (not shown) seals the closure against the rim of the mouth of the container neck.

Also shown in FIG. 1 is an RFID device 15 comprising a tag 40 and an antenna 80. The tag 40 comprises a substrate in the form of a rectangular plane circuit board on which an RFID chip 60 is located. The antenna 80 is connected to the circuit board 45 and a simple loop of conducting material (e.g. copper) acting as a circuit 50 is located on the circuit board 45 for connecting the RFID chip 60 and the antenna 80 together. The function of the loop 50 is to match the impedance of the antenna to the lower impedance of the chip.

The circuit 50 is connected to the crown 30 of the closure 10 at a single electrical connection point 70. This connection may be achieved by soldering or other such well known methods. If a wad is included in the closure, then it would lie between the tag 40 and the base 30 such that a hole is required through the wad for the single connection point 70 to pass through the wad. Since the circuit is connected to the crown 30, the closure 10 becomes one side of a dipole antenna. This is due to the closure 10 being made of metal. Though reference is made to the closure being of metal, it is to be clearly understood that the closure may be made from other materials which are electrically-conductive, including suitable plastics materials which may be coated or impregnated with electrically conductive materials.

The tag 40 is held in the closure 10 such that it depends downwardly from the crown 30 towards the open end of the closure 10. Although the tag 40 is shown as depending by one corner so that the sides of the substrate are not parallel with the sides of the closure 10, this is not essential and in fact the tag 40 could lie square with the closure sides. However, it has been found that, if the substrate is positioned substantially parallel to the crown 30, the strength of the signal is reduced such that it is difficult to read the tag remotely from the closure.

The antenna 80 is shown in the form of two diverging wires 85 extending downwardly (i.e. towards the open end of the closure 10) from the RFID tag 40. This antenna acts as the other side of the dipole antenna to the closure shell.

A further optional wire is shown in the form of a loop 90 which has its major plane parallel to the plane of the crown 30 of the closure 10. The loop 90 connects between the two wires 85 at their ends opposite their connection to the loop 50. Although the antenna 80 has been shown in this form it can take other forms such as a single straight wire or a cone of metal foil wherein the apex of the cone is connected to the substrate. All of these forms have the effect that the antenna becomes circularly polarised. Further, whichever form is employed, it has been found that the antenna 80 need not extend downwardly beyond the edge of the closure 10 for the RFID chip 60 to still be read by the reader.

The RFID chip 60 is a standard UHF RFID transponder integrated circuit which operates in the range 860 to 960 MHz, preferably 869 MHz. One example of such a chip is called "AMS3981". To read the RFID tag 40 a standard reader is used. For instance a Bistar MR100 Reader could be used.

It will be noted that the RFID device 15 is contained entirely within the closure 10 i.e. no part of the device projects beyond the open end of the skirt 20.

It has been found that, in one embodiment, if the antenna 80 is allowed to make contact with a body of liquid it has the effect that the strength of the signal is boosted so that the RFID tag 40 can be read from a greater distance. However, the antenna in this case needs to be insulated from electrical conduction with the liquid, for example by means of a non-electrically conducting layer of plastics material. Further, the antenna (80) should, in this case, contact the liquid outside of the closure.

Figure 2:
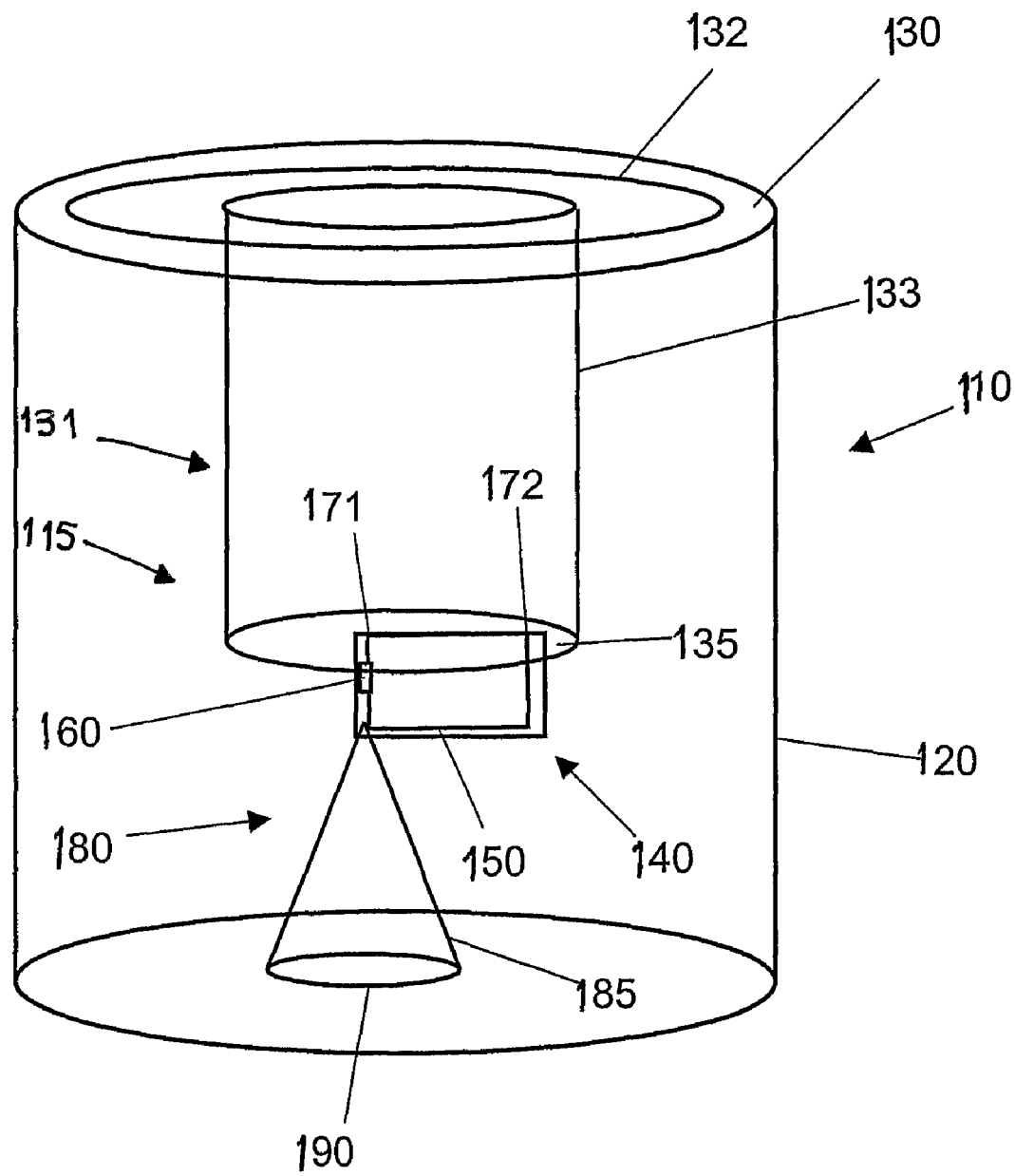
FIG. 2 shows diagrammatically a side view of a combination of a closure with an RFID tag and antenna according to another embodiment of the invention.

FIG. 2 shows a variation of the arrangement depicted in FIG. 1. Instead of the tag 140 being positioned immediately underneath the crown 130, it is positioned at a certain distance away. This is achieved by inserting an electrically conducting inverted "top-hat" shaped spacer 131 into the closure 110. This spacer 131 has a base 132 which is in direct contact with the crown 130 of the closure 110. Depending downwardly from the base 132 is a cylindrical wall 133 which has an end plate 135. The purpose of the spacer 131 is to distance the tag 140 from the crown 130, so that the antenna 180 is closer to the open end of the closure 110, while keeping the circuit 150 connected to the crown 130 such that the closure acts as one side of the dipole antenna. Accordingly, the spacer 131 does not need to be a "top-hat" shape but could be other shapes so long as it fulfils the stated purpose. The spacer can be made from copper or other electrically conductive materials, including some plastics, to improve conductivity.

In FIG. 2, the circuit 150 is shown as being connected at each of ends two 171, 172 to the end plate 135. However, this is not critical and the circuit could be connected in the same manner as shown in FIG. 1. Furthermore, the various antennas described in relation to FIG. 1 may also be employed.

With regard to the form in which the circuit 150 is connected to the closure 110 as shown in FIG. 2, this can equally apply to the embodiment shown in FIG. 1. In other words the circuit 150 on the circuit board 145 may in fact be an incomplete loop utilising the crown 130 to complete the loop.

Figure 3:
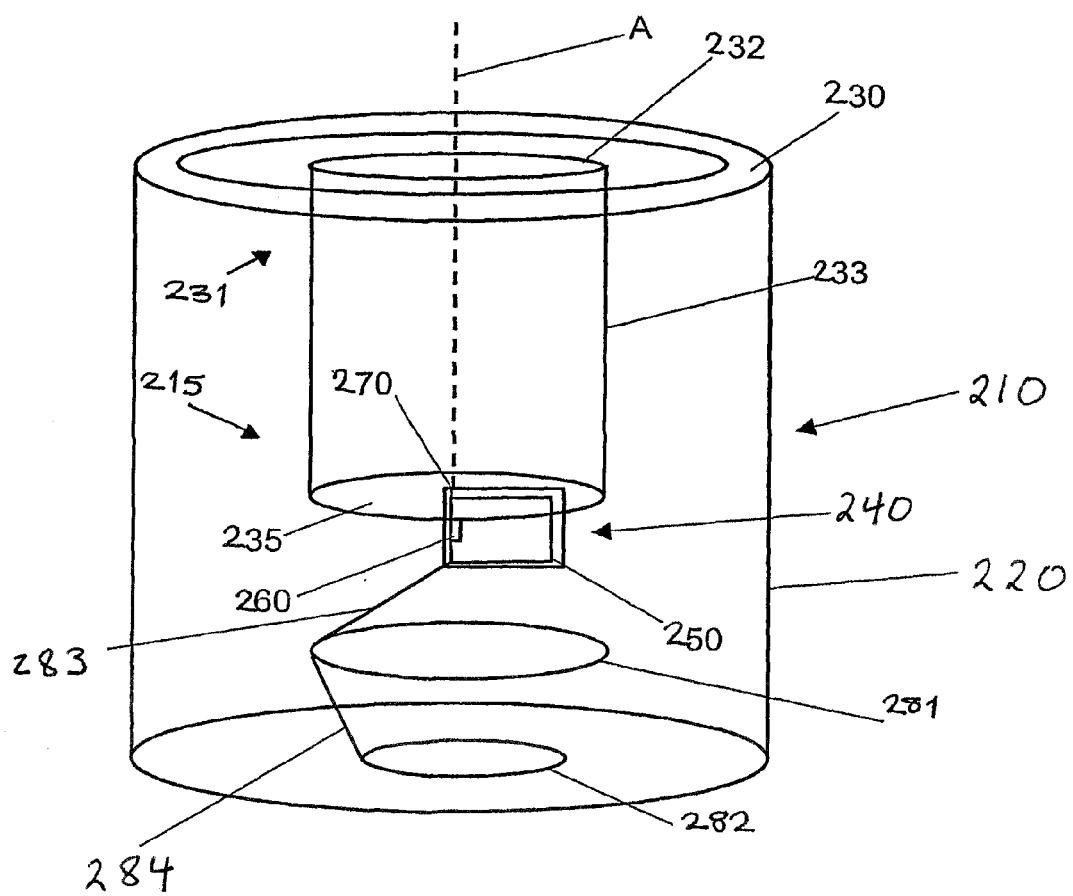
FIG. 3 shows diagrammatically a side view of a combination of a closure with an RFID tag and antenna according to yet another embodiment of the invention.

FIG. 3 shows a variation of the embodiment shown in FIG. 2. The central axis "A" of the closure 210 is indicated with a broken line. In this Figure it can be seen that the lower antenna has been replaced by two plates 281, 282 positioned perpendicularly to axis "A". The plates may be in the form of copper discs. The plates 281, 282 are suspended below, and electrically connected to, the tag 240 by means of connectors 283, 284; such connections can be provided by copper wires. The plates 281, 282 act as one side of the dipole antenna (in the same way that the antenna 80 does) and act to increase the area of one side of the dipole antenna. Although two discs are shown, other numbers of discs, including only one, would function. Also, shapes other than circular discs may be used.

It will also be noted that the chip 260 is aligned with the central axis "A" of the closure 210. This improves the regularity of the radiation pattern produced by the device which improves reading of the tag 240.

Figure 4:
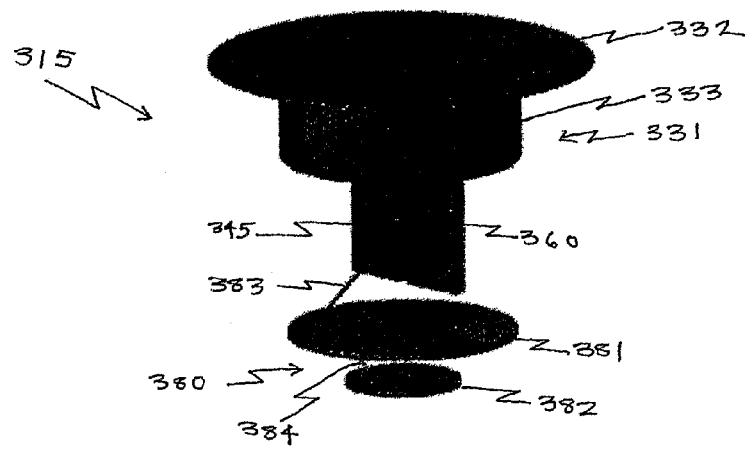
FIG. 4 is a perspective view of an RFID device formed according to the present invention.
Figure 5A:
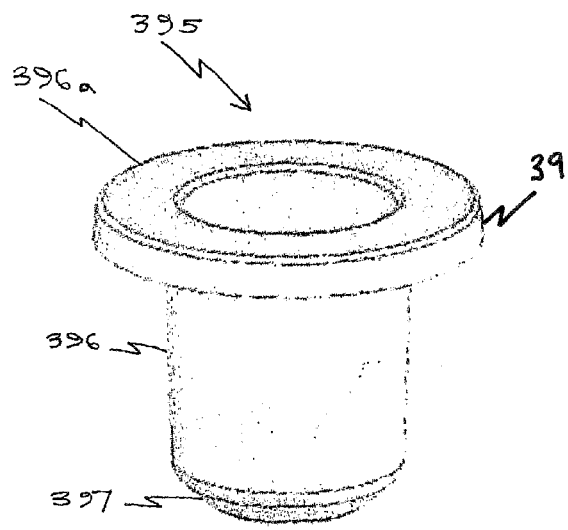
FIG. 5A is a perspective view of an insert for use in combination with an RFID device formed in accordance with the present invention.
Figure 5B:
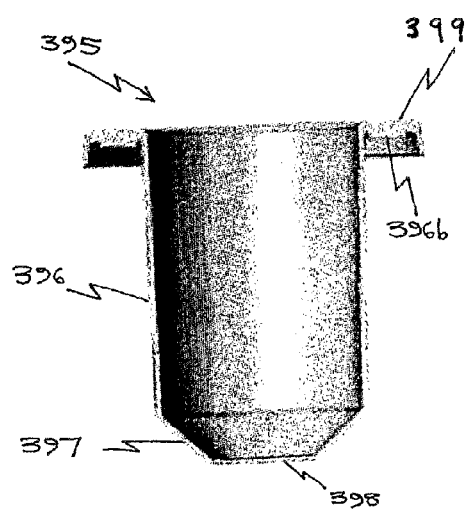
FIG. 5B is a section of the insert of FIG. 5A.

FIG. 4 shows a device 315 similar to the device 215 in FIG. 3 and adapted to fit within an insert 395 shown in FIGS. 5A and 5B. The device 315 and insert 395 are shown fitted together in FIGS. 6A and 6B and the device/insert are shown fitted into a metal closure 310 in FIG. 7. The device/insert/closure are shown fitted onto a container neck in FIG. 8.

Referring first to FIG. 4 the device 315 comprises a spacer 331, a circuit board 245 and an antenna 380 and accordingly is similar to the device shown in FIG. 3.

Figure 6A:
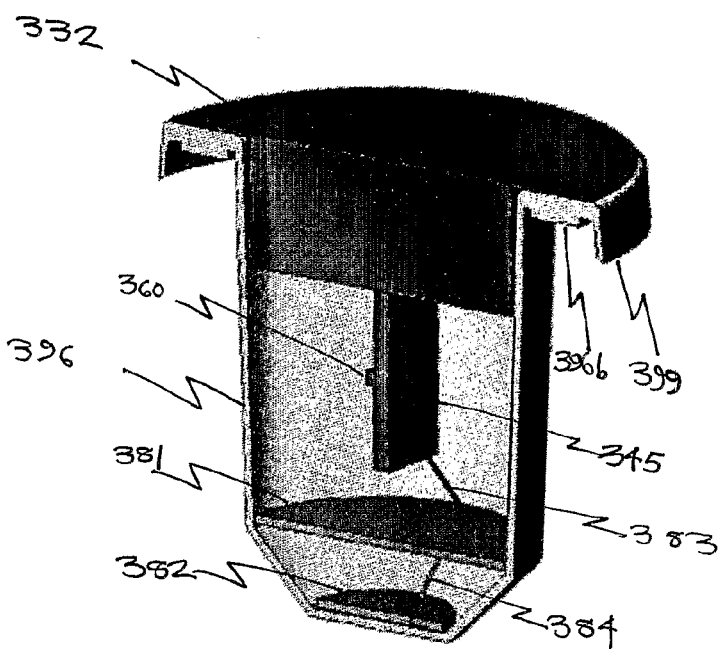
FIG. 6A is a section illustrating the RFID device of FIG. 4 incorporated into the insert of FIGS. 5A and 5B.
Figure 6B:
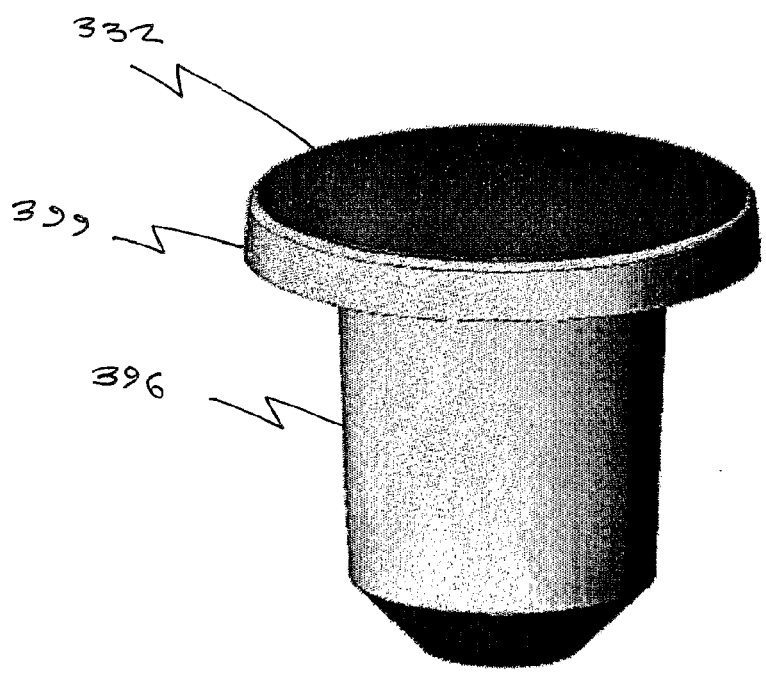
FIG. 6B is a perspective view of the RFID device/insert of FIG. 6A.

Referring now to FIGS. 5A and 5B the insert 395 has a cylindrical wall 396 which is closed at one end by a tapering wall 397 and end plate 398. Referring also to FIGS. 6A and 6B, the other end of the wall 396 is open and has the RFID device 315 inserted such that the base plate 332 rests on top of the cylindrical walls 396. The two copper plates 391, 382 are positioned such that the lower and smaller plate 382 rests on the end plate 398 and the upper and larger plate 381 rests on the junction between the cylindrical wall 396 and the tapering wall 396. The tag 340 is seen to depend straight down from the end plate 335. The connections 383, 384 between the tag 340 and the two plates 381, 382 may also be seen.

Figure 7:
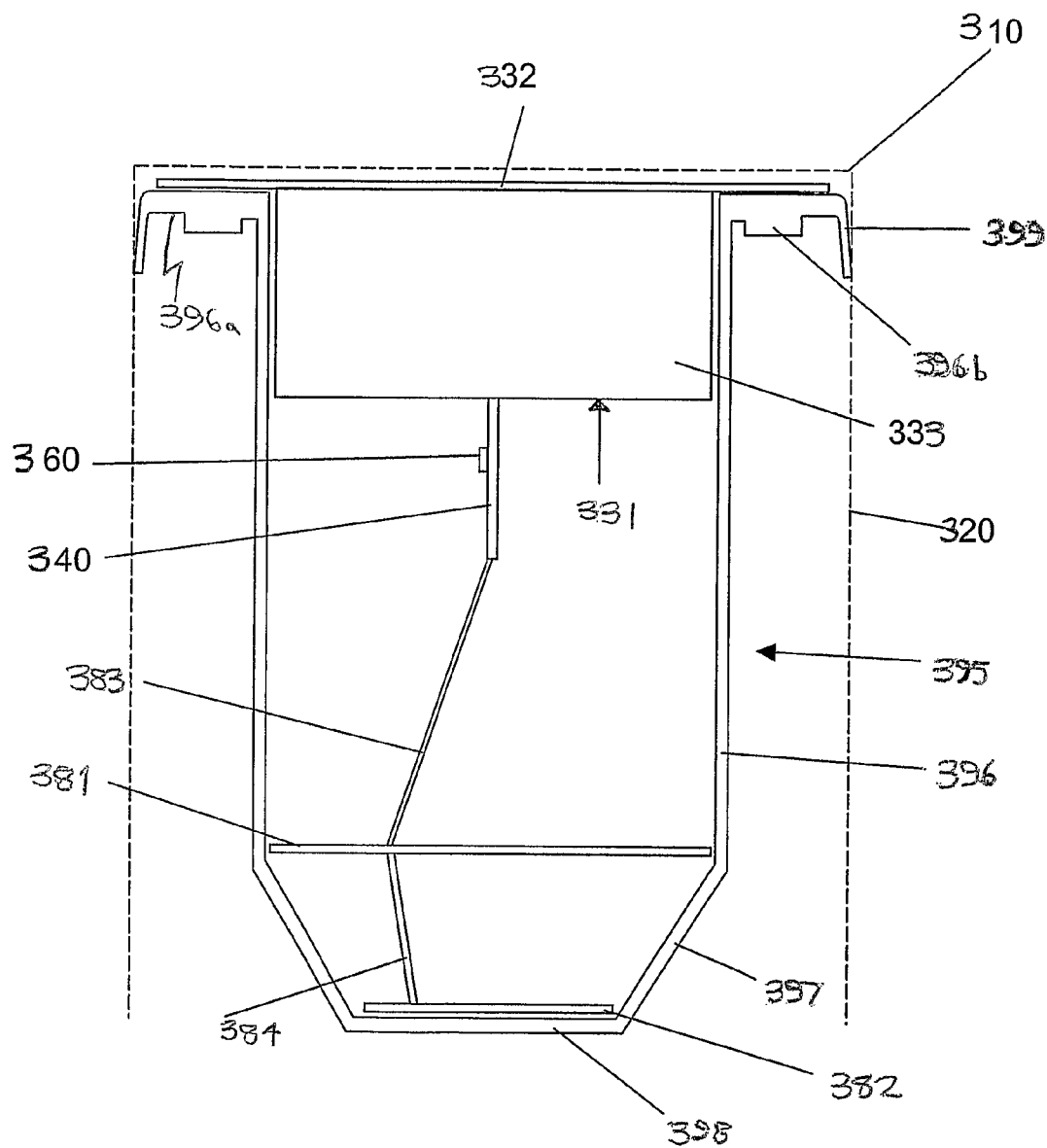
FIG. 7 shows diagrammatically the RFID device/insert of FIGS. 6A and 6B incorporated into a metal closure.

FIG. 7 shows the device 315 as described with reference to FIG. 4 has been mounted in the insert 395 which is itself mounted on the spacer 331. This insert 395 can be advantageously formed of extruded plastics material and is suitable for being itself inserted into a closure 310 with walls 311 (indicated in broken lines in FIG. 7).

Figure 8:
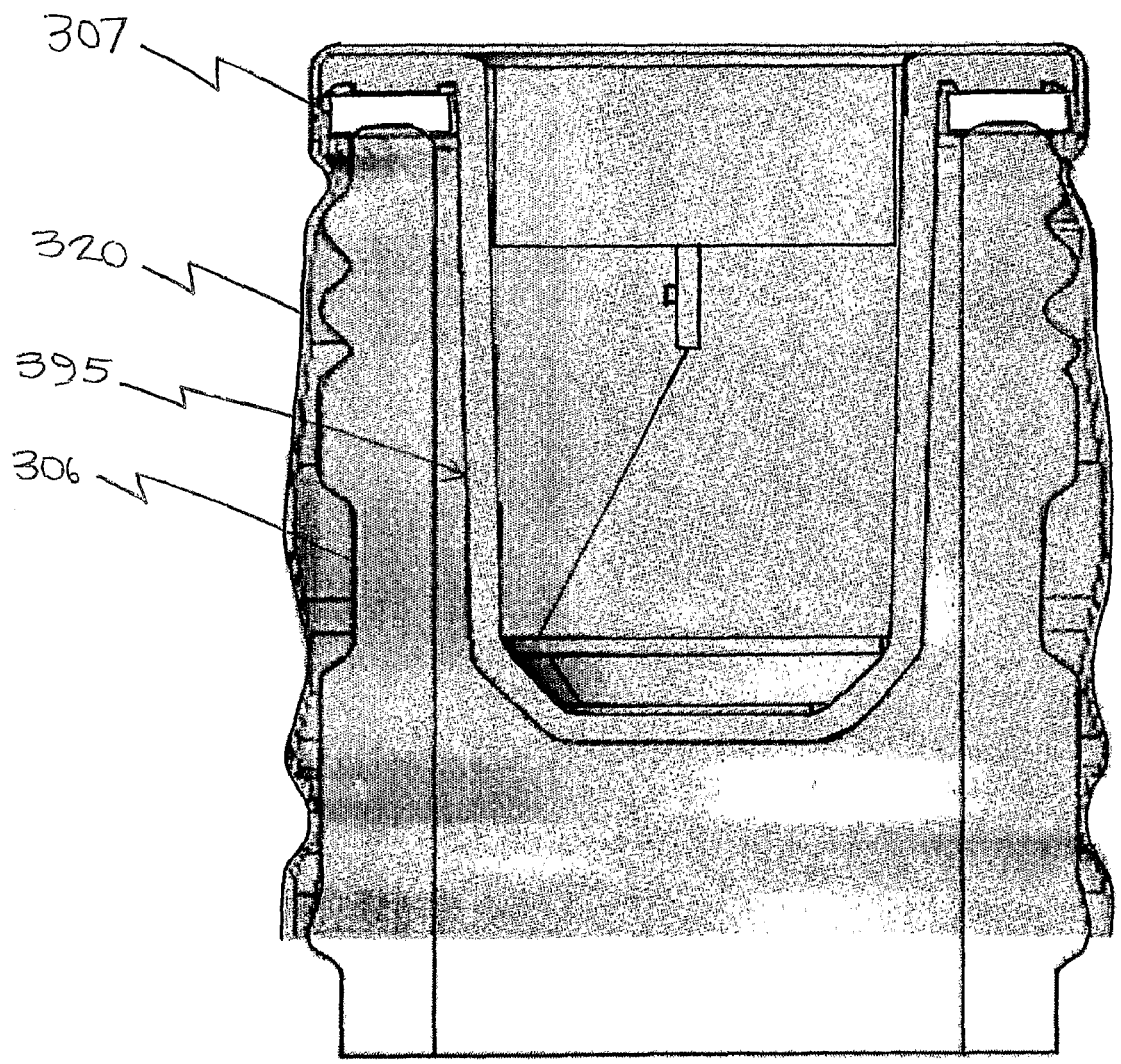
FIG. 8 is a section of the closure of FIG. 7 fitting onto a container neck.

The insert 395 also has a rim 399 which has a greater diameter than the cylindrical wall 396 and which acts to hold the insert 395 inside the closure 310. Further, between the rim 399 and the cylindrical wall 396, a stop block 396b is located on an annular flange 396b which extends around the circumference of the open end of the insert wall 396. The stop block 396b acts to limit axial movement onto the neck 306 of the associated container during fitting in conjunction with a sealing washer 307, in a manner well understood and as shown in FIG. 8. Once fitted to the neck 306, the closure 310 is "rolled" on to give the final form shown. The inward crimpings of the closure help to retain the insert in position.

Since the base 332 of the spacer 331 is made of metal or other electrically conducting material it contacts the inside of the base 330 of the closure 310 across a considerable area to promote conductivity between the two and ensure that the closure 310 may become one side of the dipole antenna.

To promote conductivity between the closure and the device, the closure 310 may be manufactured without any lacquer on the inside surface of the base 332. Alternatively, the lacquer could be removed after manufacture and before fitting of the insert 395 takes place. This is because some lacquers can act as a barrier to electrical conduction. However, electrically conductive lacquers and inks are also known which could be used to provide the appropriate effect Another aspect to the subject of electrical conduction is that of the nature of the material making up the associated container. Typically, such material will be glass.

It has been found that glass can be slightly electrically conductive and therefore when a closure with an RFID device has been fitted, an electrical connection between the container and the closure can occur. This in turn has the effect that the whole of the container becomes part of one side of the dipole antenna encapsulating the other side (the antenna 380 or plates 381, 382). This encapsulation reduces the strength of the signal and radiation field and accordingly reduces the distance over which the tag 340 may be read.

To overcome this problem, the container needs to be electrically insulated from the closure, and this can be achieved by applying a layer of lacquer to the inside walls 311 of the closure 310. Other means are of course possible. Although the concept of increasing the distance over which the tag 340 may be read by contacting the antenna with a body of liquid has been described in relation to a container and closure, it should also be understood that this could also apply in fields other than packaging wherein there is no closure as such.

In the above-described embodiments, the circuit 350 has been shown as a loop. This loop is a characteristic of the AMS3981 chip and can be eliminated for other chips such that the circuit is only linearly connecting the closure 10 on one side and the antenna on the other. It has been found that using a loop 350 allows reading of an EM Marin 4222 chip in place of an AMS 3981 chip. In normal use when used with a dipole antenna the EM Marin 4222 chip does not require such a loop.

In such circumstances it may be possible to do without the substrate and merely have the chip electrically connected to the closure or end plate by means such as a copper wire.

In one embodiment, the distance over which the tag 340 may be read is 5 cm above the base 330 and 12 cm radially outwards from the sides 311 of the closure 310. When the antenna 380 is in contact with a liquid the distance increases to more than 50 cm.

An added advantage of the insert 395 is that it protects the RFID device from mechanical and chemical damage. Furthermore, it can be pre-assembled which helps in the manufacturing of the finished article.

Although the insert 395 has only been shown and described with reference to the embodiment in which the plates 381, 382 are employed. It will, of course, be understood that it is possible to fit the other devices described herein with reference to FIGS. 1 to 3 inside such an insert.

Figure 9:
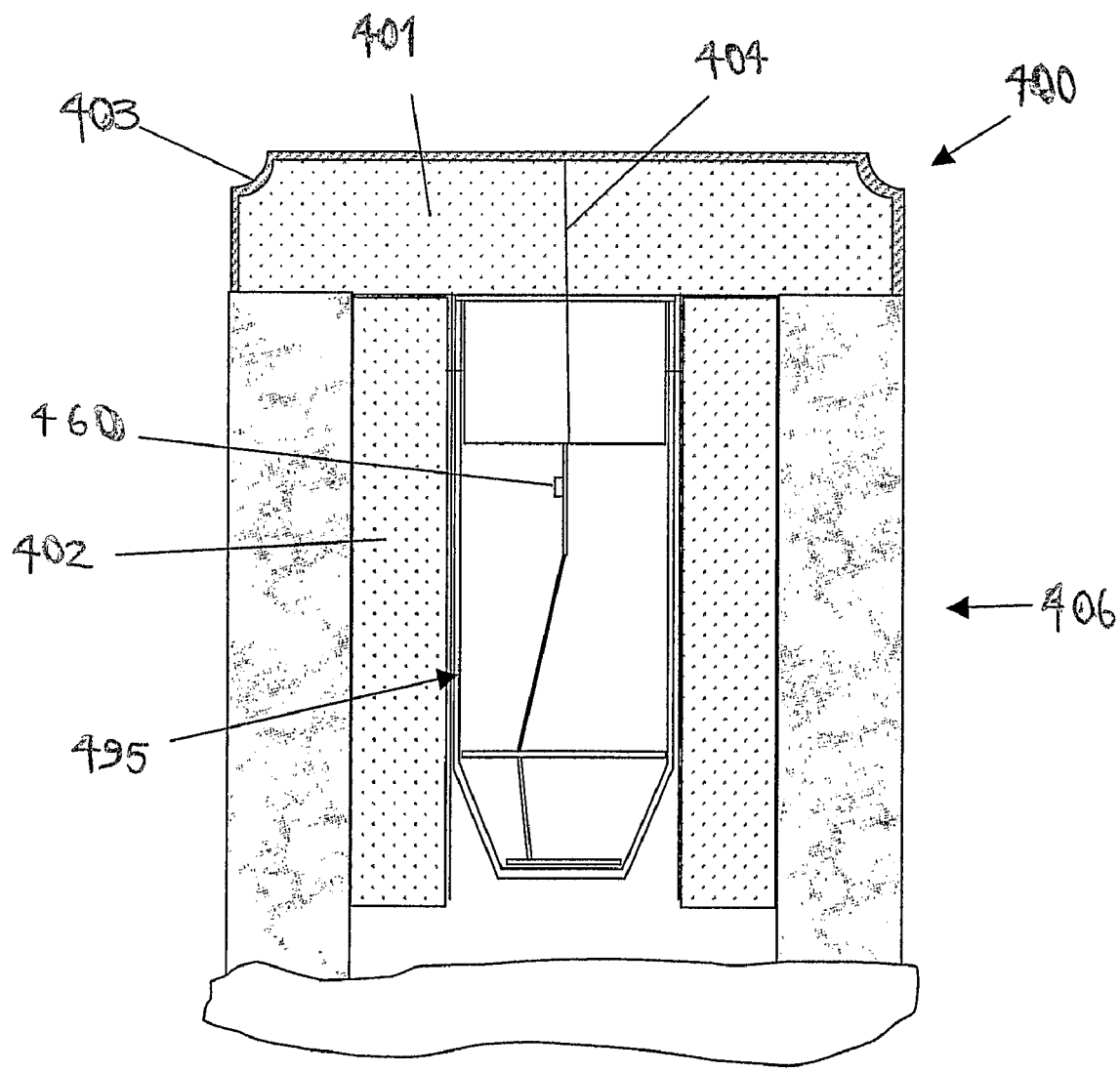
FIG. 9 is a section of a stopper formed in accordance with the present invention.

Referring now to FIG. 9, there is illustrated therein a further embodiment of the present invention as applied to a stopper member such as a cork for a wine or liqueur bottle or the like. Traditional stopper members are formed from cork but are being replaced by stopper members formed of plastics materials. Where such stopper members are used, these can comprise electrically conductive materials or be coated or clad therewith. An example of such a stopper member 400 mounted in a glass bottle neck 406 is shown.

The stopper member 400 comprises a head portion 401 and a hollow barrel portion 402 which forms a frictional fit in the neck 406 of the bottle. In the illustrated example, the head portion 401 of the stopper member is clad with an electrically-conductive outer skin 403 of metal which may be decorated or embossed. Within the hollow barrel portion 402 is mounted an insert 495 which is similar to that shown in FIG. 4 and therefore need not be further described. Extending through the head portion 401 is an electrical connection 404 which extends between the outer skin 403 and the RFID chip 460.

What is claimed:

1. A Radio Frequency Identification (RFID) device for a closure comprising an electrically conductive shell, the device comprising a tag and antenna means, the tag comprising an RFID chip and the antenna means comprising one side of a dipole, the device being, in use, entirely located within the closure and electrically coupled thereto so that the closure becomes the other side of the dipole.

2. A closure and RFID device in combination, wherein the closure comprises an electrically-conductive shell and the RFID device comprises a tag and antenna means, the tag comprises an RFID chip, and the antenna means is one side of a dipole, the RFID device being entirely located within the closure and electrically coupled to the closure so that the closure becomes the other side of the dipole.

3. A device or combination according to claim 1, wherein the antenna means is a wire formed into a cone shape.

4. A device or combination as in any one of the preceding claims, in which the RFID device comprises a loop for connecting the chip and the antenna together.

5. A device or combination according to claim 1 or claim 2, wherein the antenna means comprises at least one plate.

6. A device or combination according to claim 1 or claim 2 wherein the device further comprises a spacer for spacing the tag from the crown of a closure.

7. A device or combination according to claim 1 or claim 2, wherein the device is positioned inside an insert.

8. A device or combination according to claim 1 or claim 2, wherein, in use, the RFID chip is aligned with the central vertical axis (A) of the closure.

9. A device or combination according to claim 1 or claim 2, in combination with a container containing liquid, wherein, in use, the antenna means is in contact with the liquid.

10. A closure and RFID device in combination, wherein the closure comprises an electrically-conductive shell and the RFID device comprises an RFID chip and antenna means, and the antenna means is adapted to be one side of a dipole, and the RFID chip being electrically coupled to the electrically-conductive closure so that the closure becomes the other side of the dipole antenna, the closure and RFID device combination being associated with a body of liquid, and the antenna means being in contact with the body of liquid.

11. A closure and RFID device in combination, wherein the closure comprises a member which is arranged to provide a tight sealing fit within a neck of a container, the closure comprising electrically-conductive material and/or being coated with electrically-conductive material, and wherein the RFID device comprises an RFID chip and antenna means, and is accommodated within the member, and the antenna means is one side of a dipole, and the RFID device being entirely located within the closure and electrically coupled to the closure so that the closure becomes the other side of the dipole.

12. A closure and RFID device in combination, wherein the closure comprises a member which is arranged to provide a tight sealing fit within a neck of a container, the closure comprising electrically-conductive material and/or being coated with electrically-conductive material, and the RFID device comprising an RFID chip and antenna means, and the antenna means being adapted to be one side of a dipole, and the RFID chip being electrically coupled to the electrically-conductive closure so that the closure becomes the other side of the dipole antenna, the closure and RFID device combination being associated with a body of liquid, and the antenna means being in contact with the body of liquid.

* * * * *